United States Patent
Ramachandran et al.

[11] Patent Number: 5,548,436
[45] Date of Patent: Aug. 20, 1996

[54] OPTICAL TRANSMISSION SYSTEM

[75] Inventors: Mani Ramachandran; Hermann Gysel, both of San Jose, Calif.

[73] Assignee: Synchronous Communications, Inc., San Jose, Calif.

[21] Appl. No.: 551,542

[22] Filed: Nov. 1, 1995

Related U.S. Application Data

[63] Continuation of Ser. No. 397,551, Mar. 1, 1995, abandoned, which is a continuation of Ser. No. 97,490, Jul. 27, 1993, abandoned, which is a division of Ser. No. 904,375, Jun. 25, 1992, Pat. No. 5,359,450.

[51] Int. Cl.$^6$ .......................... H04B 10/04; H04B 10/18
[52] U.S. Cl. .......................................... 359/187; 359/180
[58] Field of Search .................................. 359/134, 173, 359/179–180, 187–188, 195, 334; 385/1, 4, 24

[56] References Cited

U.S. PATENT DOCUMENTS

| | | | |
|---|---|---|---|
| 4,625,105 | 11/1986 | Hentschel | 359/187 |
| 4,699,452 | 10/1987 | Mollenauer et al. | 350/96.16 |
| 4,922,481 | 5/1990 | Hicks | 370/4 |
| 4,935,918 | 6/1990 | Hicks | 370/4 |
| 5,012,475 | 4/1991 | Campbell | 359/188 |
| 5,027,079 | 6/1991 | Desurvire | 372/70 |
| 5,121,241 | 6/1992 | Veith | 359/152 |
| 5,153,762 | 10/1992 | Huber | 359/125 |
| 5,166,821 | 11/1992 | Huber | 359/173 |
| 5,243,613 | 7/1993 | Gysel | 372/26 |

OTHER PUBLICATIONS

Straus, "Linearized Transmitters for Analog Fiber Link" Laser Focus 10–78, pp. 54–61.

*Primary Examiner*—Leslie Pascal
*Attorney, Agent, or Firm*—Fliesler Dubb Meyer & Lovejoy LLP

[57] ABSTRACT

An optical transmission system is provided comprising a method and apparatus for cancelling noise in the output from a light source for broadening the line width of a light source so as to increase stimulated Brillouin scattering threshold in a standard single mode fiber with a dispersion null at 1310 nm and for using a linearized external modulator to modulate the amplified output of a distributed feedback laser providing an output at 1550 nanometers for use on a standard single mode fiber optic cable with a dispersion null at 1310 nm.

20 Claims, 1 Drawing Sheet

OPTICAL TRANSMISSION SYSTEM

This application is a Continuation of Ser. No. 08/397,551 filed Mar. 1, 1995, now abandoned, which is a Continuation of Ser. No. 08/097,490, now abandoned, filed Jul. 27, 1993, now abandoned, which is a Divisional of Ser. No. 07/904,375 filed Jun. 25, 1992, now U.S. Pat. No. 5,359,450.

BACKGROUND OF THE INVENTION

1. Field of the Invention

The present invention relates to optical transmission systems in general and in particular to an optical transmission system comprising a method and apparatus for cancelling noise, increasing the stimulated Brillouin scattering (SBS) threshold in a standard single mode fiber, and using an external modulator in combination with a distributed feedback (DFB) laser and an erbium doped fiber amplifier (EDFA) to transmit 1550 nanometer (nm) light over standard single mode fiber with a dispersion null at 1310 nm.

2. Description of the Related Art

Conventional prior known optical transmission systems comprising lasers, optical amplifiers, fiber optic cables, and the like, are found to have a number of deficiencies. For example, one of the deficiencies which has been found in prior known optical transmission systems is that the optical radiation from a light source comprising a distributed feedback (DFB) laser and an erbium doped fiber amplifier (EDFA) may be too noisy for some applications.

Another deficiency in prior known optical transmission systems, specifically those comprising a directly modulated DFB and an EDFA as described above which are coupled to a standard single mode fiber with a dispersion null at 1310 nm, is that the EDFA is operable only at wavelengths longer than 1310 nm, e.g. 1550 nm, and that at those wavelengths composite second order (CSO) distortions are generated in the fiber. The standard single mode fiber with a dispersion null at 1310 nm referred to herein corresponds to the SMF-28 fiber which is commercially available from Corning Incorporated, Corning, N.Y.

Heretofore, the methods and apparatus used to reduce noise and compensate for CSO distortions has been limited generally to electrical and optical compensation circuits such as disclosed in applicants' U.S. Pat. No. 5,115,440, applicants' U.S. patent application Ser. No. 07/787,830, both of which are assigned to the assignee of the present application, and a paper presented by Richard B. Childs and Vincent A. O. Byrne in the OPTICAL FIBER COMMUNICATION CONFERENCE, 1990 Technical Digest Series, Vol. 1, Conference Edition, January 1990.

Another deficiency in prior known optical transmission systems has to do with the effect of stimulated Brillouin scattering in a standard single mode fiber.

Stimulated Brillouin scattering (SBS) is a phenomenon which restricts the amount of optical power which can be transferred in a standard single mode fiber with a dispersion null at 1310 nm. That is to say, the SBS threshold, i.e. the maximum amount of optical power which can be transferred in a standard single mode fiber, is limited to a certain amount of power at a given wave length in a certain bandwidth for a given length of the fiber such that, as the length of the fiber or the wavelength increases, its ability to handle the power decreases. For example, the amount of optical power at 1310 nm that can be transferred in a standard single mode fiber with a dispersion null at 1310 nm, 50 kilometers (km) long is approximately 5 milliwatts (mW). At 1550 nm, the amount of power that can be input to the same fiber is approximately 4 mW.

Still another deficiency noted in prior known conventional optical transmission systems arises from the use of yttrium aluminum garnet (YAG) and yttrium lanthanum fluoride (YLF) lasers with standard nonlinear external modulators. Among the problems in these types of systems is the problem that nonlinear external modulators have a relatively low depth of modulation, e.g. 2%, thus providing a relatively low signal/carrier-to-noise ratio, and the problem that the YAG and YLF lasers, while providing relatively high power, e.g. 175 mW and 100 mW, respectively, are relatively expensive and have relatively short life times.

SUMMARY OF THE INVENTION

In view of the foregoing, a principal object of the present invention is an optical transmission system comprising a method and apparatus for cancelling noise in the output of an optical source comprising a directly modulated distributed feedback (DFB) laser coupled to an erbium doped fiber amplifier (EDFA).

In an embodiment of the present invention for cancelling noise as described above, there is provided a means for sampling the output of the EDFA to obtain a sample of the noise therein, converting the sample to an electrical noise signal, inverting the electrical noise signal, combining the inverted electrical noise signal with a second modulation signal, i.e. data/information, and modulating the output of the EDFA with the combined signal to obtain a noise free modulated data signal. The noise free modulated data signal is then further amplified in another EDFA if desired.

Another object of the present invention is an optical transmission system comprising a method and apparatus for increasing the stimulated Brillouin scattering (SBS) threshold in a standard single mode fiber with a dispersion null at 1310 nm and stabilizing a 1550 nm DFB laser coupled thereto.

In an embodiment of the present invention for increasing the SBS threshold in a standard single mode fiber with a dispersion null at 1310 nm and stabilizing a 1550 nm DFB laser coupled thereto there is provided a means for directly modulating the laser with a constant amplitude signal having a predetermined frequency, e.g. 1 GHz, to thereby broaden the line width of the laser from approximately 40 MHz to approximately 2 GHz, i.e.±1 GHz.

Another object of the present invention is an optical transmission system comprising a method and apparatus for using an external linearized modulator with a DFB laser which has the advantage of avoiding composite second order (CSO) distortions at 1550 nm in a standard single mode fiber with a dispersion null at 1310 nm while providing a carrier with a high signal/carrier-to-noise ratio.

BRIEF DESCRIPTION OF THE DRAWINGS

The above and other objects, features and advantages of the present invention will become apparent from the following detailed description of the accompanying drawings, in which.

DESCRIPTION OF THE PREFERRED EMBODIMENTS

Figure 1:
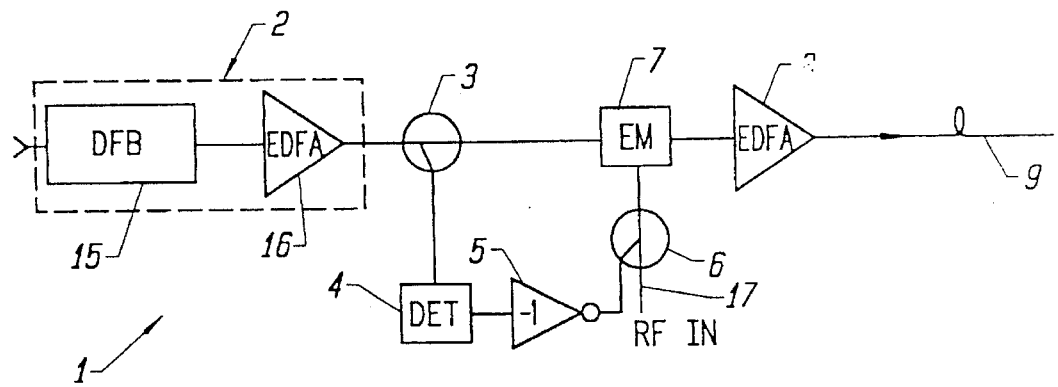
FIG. 1 is a block diagram of an embodiment of the present invention for cancelling noise in the output of a light source comprising a DFB laser and an erbium doped fiber amplifier (EDFA)

Referring to FIG. 1, there is provided in accordance with the present invention an optical transmission system designated generally as 1. In the transmission system 1 there is provided a source of light 2, an optical beam splitter 3, a detector 4, an inverter 5, a combiner 6, an external modulator 7 and an erbium doped fiber amplifier (EDFA) 8 coupled to a fiber optic cable 9.

In the source 2 there is provided a distributed feedback (DFB) laser 15 and an erbium doped fiber amplifier (EDFA) 16.

In operation, the DFB 15 generates coherent radiation which is amplified in the EDFA 16. To cancel noise in the output of the EDFA 16 a portion of the light output of the EDFA 16 is directed by the beam splitter 3 to the detector 4 wherein it is converted to an electrical noise signal. The electrical noise signal is then inverted in the inverter 5, i.e. the phase of the noise signal is shifted 180° relative to the noise in the output of the EDFA 16. The output of the inverter 5 is then coupled to the signal combiner 6. In the signal combiner 6 the output of the converter 5 is combined with data/input on the input line 17 of the combiner 6. The output of the combiner 6 is provided to the modulating signal input of the external modulator 7. In the external modulator 7 the light from the EDFA 16 is modulated by the output from the combiner 6. Because the output of the combiner 6 comprises a noise component which is 180° out of phase with the noise component in the output of the EDFA, the noise component is cancelled in the output of the modulator 7 such that the EDFA 8 amplifies an essentially noise-free data signal for transmission over the fiber optic cable 9.

Figure 2:
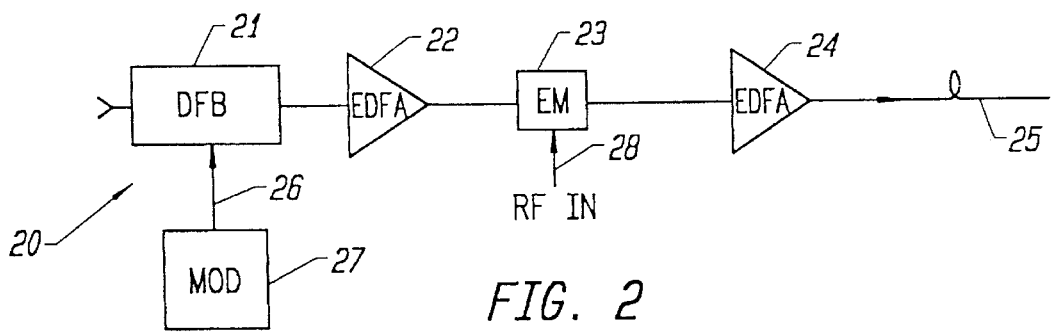
FIG. 2 is a block diagram of another embodiment of the present invention for increasing the line width of a DFB laser coupled to an EDFA and, thus, the stimulated Brillouin scattering (SBS) threshold of a standard single mode fiber with a dispersion null at 1310 nm coupled to the EDFA.

Referring to FIG. 2, there is provided in accordance with another embodiment of the present invention an optical transmission system designated generally as 20. In the transmission system 20 there is provided a distributed feedback laser (DFB) 21. Coupled to the output of the DFB 21 there is provided an EDFA 22. Coupled to the output of the EDFA 22 there is provided an external modulator 23. Coupled to the output of the external modulator 23 there is provided an EDFA 24. The output of the EDFA 24 is coupled to a fiber optic cable 25. The DFB 21 is a directly modulated laser receiving a modulating signal on a signal line 26 from a modulator 27.

In practice, the fiber optic cable 25 is limited in the amount of power it will accept at a given wavelength in a certain bandwidth for a given length of the fiber optic cable. This limit is the result of a phenomenon known as stimulated Brillouin scattering (SBS) the threshold of which, as indicated above, is a function of the wavelength of the light and the length of the fiber optic cable over which the light is being transmitted.

Figure 4:
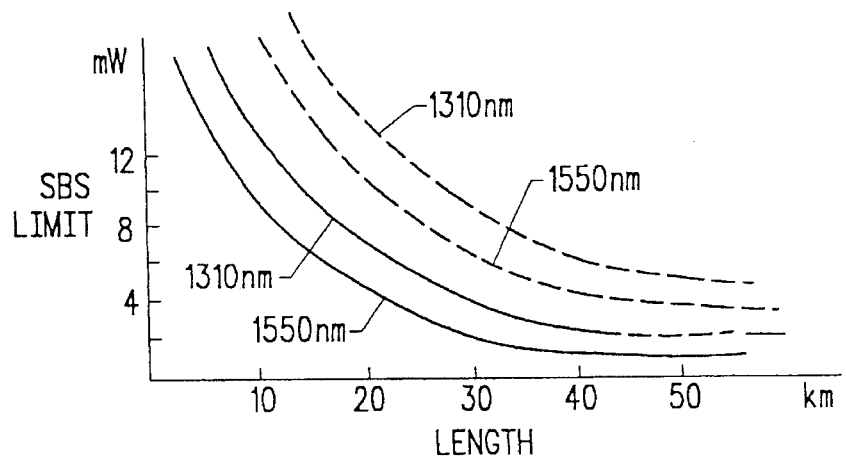
FIG. 4 is a drawing showing the relationship between the SBS threshold versus length of a fiber optic cable for various wavelengths of optical radiation.

Referring to FIG. 4, there is shown a diagram of the SBS limit for a fiber optic cable versus the length of the cable for two different wavelengths of coherent radiation. As can be seen from FIG. 4, as the length of the cable and the wavelength of the light increases, the SBS limit decreases.

Referring again to the optical transmission system 20 of FIG. 2, it has been found that by modulating the DFB 21 with a modulating signal having a predetermined frequency, e.g. 1 GHz, with a constant amplitude, e.g. 4 milliamps, peak to peak, the line width of the radiation provided by the DFB 21 relative to a center frequency of 1550 nm is broadened from approximately 40 MHz to approximately 2 GHz, i.e.±1 GHz. The broadening of the line width of the output of the DFB 21 is found to provide a corresponding increase in the SBS threshold in the fiber optic cable 25. It is also found to reduce noise in the output of the DFB 21 and therefore stabilize the laser. As described above with respect to the apparatus of FIG. 1, the external modulator 23 is provided to receive a modulating signal on an input modulating signal line 28 for modulating the light from the EDFA 22. The post modulation amplifier EDFA 24 is then used to further amplify the light before it is transmitted over the fiber optic cable 25.

Figure 3:
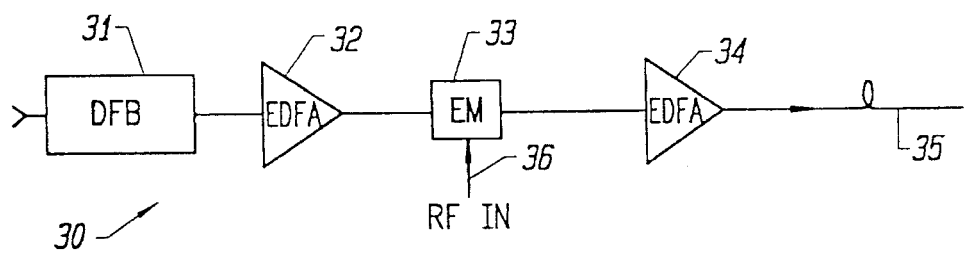
FIG. 3 is another embodiment of the present invention comprising a distributed feedback laser, an EDFA and a linearized external optical modulator for modulating the output of the EDFA.

Referring to FIG. 3, there is provided in another embodiment of the present invention an optical signal transmission system designated generally as 30. In the system 30 there is provided a DFB 31. Coupled to the output of the DFB 31 there is provided an EDFA 32. Coupled to the output of the EDFA 32 there is provided an external modulator 33. Coupled to the output of the external modulator 33 there is provided an EDFA 34. Coupled to the output of the EDFA 34 there is provided an optic fiber cable 35. The external modulator 33 includes a modulation signal input line 36.

In operation, the DFB 31 provides coherent radiation to the EDFA 32. The EDFA 32 amplifies the radiation which is then modulated by a modulating signal on the input line 36 in the external modulator 33. The modulated signal is then provided to the EDFA 34 which amplifies the signal and provides it on the fiber optic cable 35.

The optical transmission system 30 of FIG. 3 has several advantages. One of the advantages is that the system uses a distributed feedback (DFB) laser which in comparison to known yttrium aluminum garnet (YAG) and yttrium lanthanum fluoride (YLF) lasers, while providing less power, is considerably less expensive and vastly more reliable.

Another advantage of the embodiment of FIG. 3 is that the external modulator 33 comprises a linearized external modulator instead of a standard non-linear modulator as used in prior art systems. Linearized modulators of the type described herein are commercially available as Model No. SW115P from Crystal Technology located in Palo Alto, Calif. The linear modulator, while having a significant insertion loss compared to a standard modulator, e.g. 10 db versus 4 db, has approximately twice the depth of modulation, e.g. 4% versus 2%, of the standard modulators. The increased depth of modulation significantly increases the signal/carrier-to-noise ratio.

To compensate for the lower power output of the DFB lasers and the signal loss in the modulator 33, the EDFA 32 amplifies the output of the DFB 31 and the EDFA 34 amplifies the output of the modulator 33.

A further advantage of the external modulator 33 is that the external modulator 33 avoids inducing composite second order (CSO) distortions in the standard single mode fiber 35 with a dispersion null at 1310 nm. Since optical amplifiers such as EDFA 32 can operate only at 1550 nm and directly modulated DFBs would produce CSO at that wavelength in a standard single mode fiber, the use of the external modulator 33 has the further advantage of avoiding the CSO distortions in the fiber 35.

While preferred embodiments of the present invention are described above, it is contemplated that numerous modifications may be made thereto for particular applications without departing from the spirit and scope of the present invention. Accordingly, it is intended that the embodiments described be considered only as illustrative of the present invention and that the scope thereof should not be limited thereto but be determined by reference to the claims hereinafter provided.

What is claimed is:

1. An optical transmission system comprising:

a source of light;

means for providing an electrical noise signal corresponding to noise in the light from the source, but which is shifted 180 degrees relative to the noise in the light from the source; and means responsive to the light from the source and said electrical noise signal for modulating the light from the source with a combination of said electrical noise signal and an input signal such that said electrical noise signal cancels the noise in the light from the source to provide a substantially noise free data signal for transmission.

2. A method of transmitting optical signals comprising the steps of:

providing light from a source of light;

providing an electrical noise signal corresponding to noise in the light from the source, but which is shifted 180 degrees relative to the noise in the light from the source; and modulating the light from the source with a combination of said electrical noise signal and an input signal such that said electrical noise signal cancels the noise in the light from the source to provide a substantially noise free data signal for transmission.

3. An optical transmission system, comprising:

light source that generates radiation which includes a noise component;

detector that generates an electrical noise signal in response to the radiation from the light source;

inverter that generates an inverted electrical noise signal in response to the electrical noise signal wherein the inverted electrical noise signal includes a noise component which is 180 degrees out of phase in relation to the noise component of the radiation from the light source;

modulator that provides a substantially noise free data signal by modulating the radiation from the light source with the inverted electrical noise signal and an input signal such that the noise component of the inverted electrical noise signal cancels the noise component of the light signal.

4. The optical transmission system of claim 3, further comprising a signal combiner that provides a modulation input signal for the modulator by combining the inverted electrical noise signal with the input signal.

5. The optical transmission system of claim 4, wherein the light source comprises:

laser that generates the radiation;

amplifier the amplifies the radiation and that introduces the noise component into the radiation.

6. The optical transmission system of claim 5, wherein the laser is a distributed feedback laser.

7. The optical transmission system of claim 6, wherein the amplifier is an erbium doped fiber amplifier.

8. The optical transmission system of claim 3, further comprising a beam splitter that directs a portion of the radiation from the light source to the detector and a portion of the radiation from the light source to the modulator.

9. The optical transmission system of claim 3, further comprising an amplifier coupled to a fiber optic cable, the amplifier receiving the data signal from the modulator and transmitting the data signal over the fiber optic cable.

10. An optical transmission system, comprising:

light source that generates coherent radiation;

amplifier that amplifies the coherent radiation while introducing a noise component into the coherent radiation;

means for generating an electrical noise signal in response to the noise component of the coherent radiation;

means for generating an inverted electrical noise signal in response to the electrical noise signal;

modulator that provides a substantially noise free data signal by modulating the coherent radiation from the amplifier with the inverted electrical noise signal and an input signal such that a noise component of the inverted electrical noise signal cancels the noise component of the coherent radiation from the amplifier.

11. The optical transmission system of claim 10, wherein the means for generating the inverted electrical noise signal comprises an inverter such that the inverted electrical noise signal includes the noise component which is 180 degrees out of phase in relation to the noise component of the coherent radiation from the amplifier.

12. The optical transmission system of claim 11, further comprising a signal combiner that provides a modulation input signal for the modulator by combining the inverted electrical noise signal with the input signal.

13. The optical transmission system of claim 12, wherein the light source comprises a distributed feedback laser.

14. The optical transmission system of claim 13, wherein the amplifier is an erbium doped fiber amplifier.

15. The optical transmission system of claim 14, further comprising a beam splitter that directs a portion of the coherent radiation from the amplifier to the detector and another portion of the coherent radiation from the amplifier to the modulator.

16. The optical transmission system of claim 15, further comprising a second amplifier coupled to a fiber optic cable, the second amplifier amplifying the data signal from the modulator and transmitting the data signal over the fiber optic cable.

17. The optical transmission system of claim 16, wherein the second amplifier is an erbium doped fiber amplifier.

18. A method for cancelling noise in optical transmission system, comprising the steps of:

generating coherent radiation and amplifying the coherent radiation while introducing a noise component into the coherent radiation;

generating an electrical noise signal in response to the noise component of the coherent radiation;

generating an inverted electrical noise signal in response to the electrical noise signal;

modulating the coherent radiation including the noise component with the inverted electrical noise signal such that a noise component of the inverted electrical noise signal cancels the noise component of the coherent radiation.

19. The method of claim 18, wherein the step of generating the inverted electrical noise signal comprises the step of generating the inverted electrical noise signal such that the noise component of the inverted electrical noise signal is 180 degrees out of phase in relation to the noise component of the radiation.

20. The method of claim 19, further comprising the step of generating a modulation input signal by combining the inverted electrical noise signal with an input signal such that the modulation input signal modulates the coherent radiation which includes the noise component.

* * * * *